United States Patent [19]

Naulapää et al.

[11] 4,274,743
[45] Jun. 23, 1981

[54] METHOD AND APPARATUS FOR OPTICAL MEASUREMENT OF THE DIMENSION OF AN OBJECT

[76] Inventors: Erkki U. Naulapää, Turskatie 4, 01490 Vantaa 49; Pekka Halko, Albertinkatu 17 B 28, 00120 Helsinki 12, both of Finland

[21] Appl. No.: 2,447

[22] Filed: Jan. 10, 1979

[30] Foreign Application Priority Data

Jan. 18, 1978 [FI] Finland ............................. 780164

[51] Int. Cl.³ ........................................ G01B 11/02
[52] U.S. Cl. ............................. 356/387; 250/237 R
[58] Field of Search ............................ 356/384–387; 250/237 R, 560, 237 G

[56] References Cited

U.S. PATENT DOCUMENTS

| 3,173,019 | 3/1965 | Wormser | 250/203 R |
|---|---|---|---|
| 3,500,055 | 3/1970 | Russell et al. | 356/373 |
| 3,529,170 | 9/1970 | Russell | 356/395 |
| 3,776,640 | 12/1973 | Ikegami | 356/387 |
| 4,025,796 | 5/1977 | Erdmann | 250/237 R |

Primary Examiner—William H. Punter
Attorney, Agent, or Firm—Scully, Scott, Murphy & Presser

[57] ABSTRACT

A method and apparatus for optical measurement of the dimension of an object by allowing a ray of light that preserves its direction to sweep across a photoelectrical transformer through a screen placed in front of same. The screen comprises alternate non-transparent and transparent fields such that the photoelectrical transformer receives light pulses. The object to be measured is placed in front of the screen such that it prevents access of the light ray onto the screen and, accordingly, to the photoelectrical transformer within an area corresponding to the dimension to be measured. The received light pulses are converted into electrical pulses, on the basis of whose number it is possible to calculate the dimension to be measured. The screen is divided into a number of component screens with equally divided area arrangements, placed parallel and overlapping each other, the light pulses received from said component screens being sensed and counted separately for each component screen.

4 Claims, 5 Drawing Figures

METHOD AND APPARATUS FOR OPTICAL MEASUREMENT OF THE DIMENSION OF AN OBJECT

The present invention concerns a method for optical measurement of the dimension of an object by allowing a ray of light that preserves its direction to sweep across a photoelectrical transformer through a screen placed in front of same, which screen consists of alternate non-transparent and transparent fields so that the photoelectrical transformer receives light pulses, whereby the object to be measured is placed in front of the screen so that it prevents access of the light ray onto the screen and, accordingly, to the photoelectrical transformer within an area corresponding the dimension to be measured, and the received light pulses are converted into electrical pulses, on the basis of whose number it is possible to calculate the dimension to be measured.

The present invention also concerns an equipment for carrying out the method.

A digital method of measurement based on a sweeping light ray and on a measuring screen is known from the Finnish Patent Application No. 1366/72 and, now later, from equipment in practical operation. In these systems, however, only the measuring screen is used, whereby the precision of measurement is in practice limited by the diffraction of light in the way to be described later.

A measuring device based on sweeping by a light ray may be constructed, e.g., in the way shown in FIG. 1. The screen 6 consists, on one hand, of non-transparent and, on the other hand, of transparent areas, e.g., of stripes, and from the screen the light is passed to light sensors 7, which convert the light pulses into electrical form. In order that the amplitude of the pulses be of constant magnitude and that pulses be formed from each transparent area in the screen, the maximum width of the ray of light to be used must be larger than the width of the black, non-transparent area in the screen.

The screen may be constructed with a very fine division; in optics, such a device is called grid. Thus, the division in the screen does not restrict the precision attainable by means of this method.

A ray of light, particularly a monochromatic laser beam, may also be focused to be very thin. However, the diameter of the focus point and the convergence of the incoming ray of light are dependent from each other. In the case shown in FIG. 2, the diameter of the focus point and the convergence of the ray can be determined from the formula:

$$\tfrac{1}{2}d = \frac{1.22 \lambda 1}{D} \quad (1)$$

A depth of focus corresponding, e.g., double diameter of the focus point is obtained from the formula:

$$2 l_2 \cong \frac{2 d^2}{1.22 \lambda} \quad (2)$$

In the device in accordance with FIG. 1, the ray of light is focused to its minimum width only in one point on the screen, elsewhere the focus is either in front of or behind the screen. Thus, when attempts are made to improve the measuring precision, the basic problem of optics, the focus/depth-of-focus problem is encountered. In practical measuring devices, the limit is fixed by the diffraction of light in accordance with formula (1). The precision could be improved by using blue or ultra-violet light, but so far, no reliable and inexpensive lasers transmitting such light have been introduced on the market. Employment of any other except laser light in devices in accordance with this method of measurement is excluded owing to colour errors and focusing difficulties.

An objective of the present invention is to eliminate the above drawbacks and to improve the precision of optical measurement of described type.

This objective has been achieved by means of the present invention, which invention is based on the discovery that the precision of measurement can be improved by making the measuring screen out of two or more component screens with the same division, placed in parallel as overlapping each other, whereby the light pulses obtained from the component screens are sensed and counted separately for each component screen. The numbers of pulses may be calculated by means of a computer, and by comparing the numbers received from different screens it is possible to control the operation of the measuring device automatically and, in the case of a disturbance, to discard an erroneous result.

More specifically, the method in accordance with the invention is mainly characterized in that a screen is used that is divided into at least two component screens with equally divided area arrangements, placed parallel and overlapping each other, the light pulses received from said component screens being sensed and counted separately for each component screen.

On the other hand, the apparatus in accordance with the invention is mainly characterized in that the screen is divided into at least two component screens with equally divided area arrangements, placed parallel and overlapping each other, the photoelectrical transformer is accordingly divided into at least two separate component transformers for receiving the light pulses coming from the different component screens, and the apparatus comprises counting and comparison means for counting and processing the electrical pulses coming from the component transformers.

By means of the invention, it is possible to improve the precision of a digital measurement device based on the sweeping of a ray of light to a considerable extent beyond the possibilities provided by solutions known by now.

The invention will be examined more closely below with the aid of the attached drawings.

Figure 1:
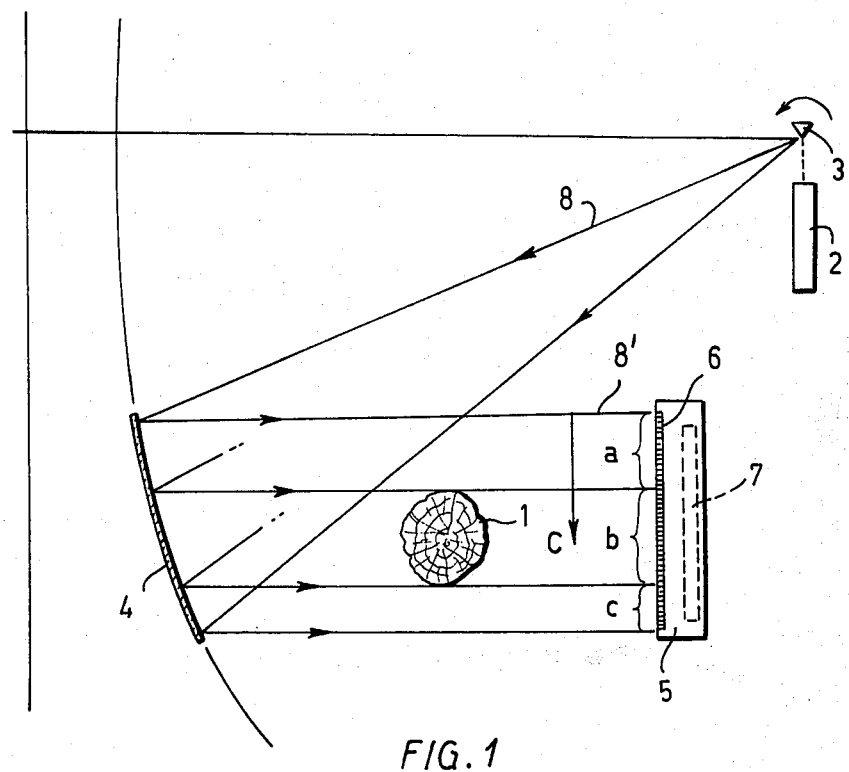
FIG. 1 is, as has already come out, a schematical view of the measurement method constituting the basis of the invention.
Figure 2:
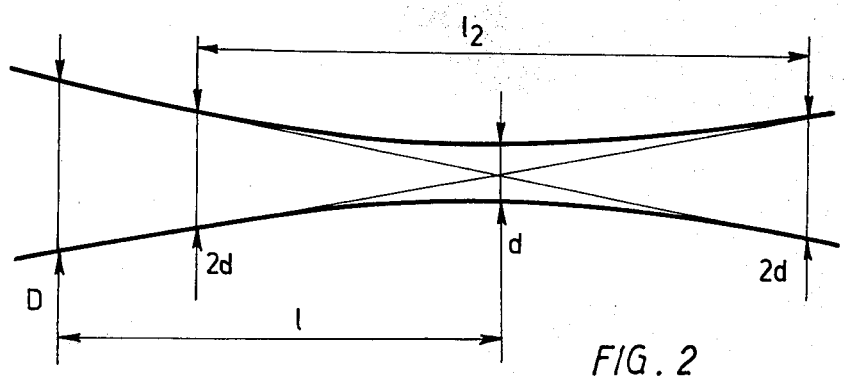
FIG. 2 illustrates the focusing of a ray of light.

According to FIG. 1, the beam departing from the laser 2 meets the rotable mirror 3, from which it is reflected onto another mirror 4, whose cross-sectional shape is that of a parabolic curve. The rotary mirror 3 is placed at the focus of the imaginary parabola, whereby the beams 8' reflected from the parabolic mirror 4 are parallel. When the mirror 3 rotates in the direction indicated by arrow E, the beam 8' reflected from the parabolic mirror 4 sweeps across the screen 6 without changing its direction. Then, a "shadow" precisely of the size of the object 1 to be measured is obtained on the screen when the beam 8' moves across the length of the screen 6. In the area a and c, light pulses are produced, because the beam 8' is cut off at each non-transparent stripe, i.e. a blinking light is produced. On the intermediate area b, on the other hand, the object 1 to be measured prevents access of the beam 8' onto the screen 6, whereby no pulses are produced at all. The thickness of the object to be measured is then obtained from the formula $$b = h - a - c \qquad (3)$$

wherein h denotes the total length of the screen. The unit of measurement is the division interval, i.e. the total width of a nontransparent and a transparent part, e.g. 2 mm.

Owing to the short length of the curve portion, it is easy to construct the parabolic mirror 4, and the precision of the mirror does not influence the precision of the method used. E.g., when the thickness of logs is measured, the curve radius of the mirror 4 may vary within the range of 2 to 5 meters.

In the present case, the laser 2, the rotable mirror 3, and the parabolic mirror 4 together constitute the sweeping means with whose aid it is possible to displace the ray of light 8' without changing its direction.

The photoelectrical transformer 7, which receives the light pulses and converts them into electrical pulses, is divided into two separate component transformers 7A and 7B for the reception of the light pulses coming from the component screens 6a and 6b.

Figure 5:
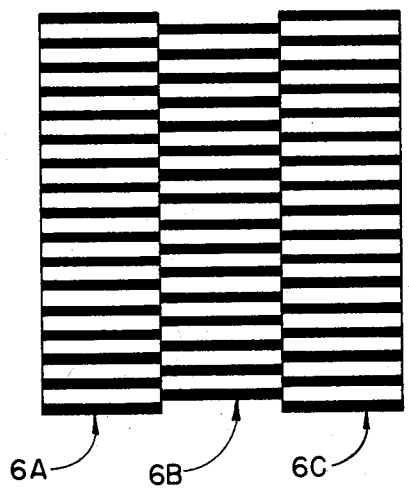
FIG. 5 illustrates an embodiment having three component screens 6A, 6B and 6C.

The screen 6 consists of alternate non-transparent and transparent stripes 11, 10 and is placed in front of the photoelectrical transformer 7 so that, when meeting the screen 6, the ray of light 8' can pass through the screen at the transparent stripes 10. In the example case, the screen 6 is divided into two component screens 6a and 6b with equal division of stripes 10, 11, placed parallel and overlapping each other. FIG. 5 illustrates an embodiment having three component screens 6A, 6B and 6C. The equipment further includes calculators 8A and 8B and a computer 9 operating as the comparison and output unit for the electrical pulses coming from the calculators 8A and 8B.

In the example case the overlapping of the stripes 10, 11 is arranged so that a black stripe 11 of each component screen 6A and 6B always coincides with a transparent stripe 10 on the adjoining component screen. A front of light of the width of the slot, i.e. of the transparent strip 10, moves in the direction indicated by arrow C across both component screens 6A and 6B.

When thicknesses, e.g., of logs are measured, there must be a sufficient distance between the log 1 and the parabolic mirror 4, on one hand, and between the log 1 and the screen 6, on the other hand, because the log 1 moves and may cast dirt around it.

Figure 3:
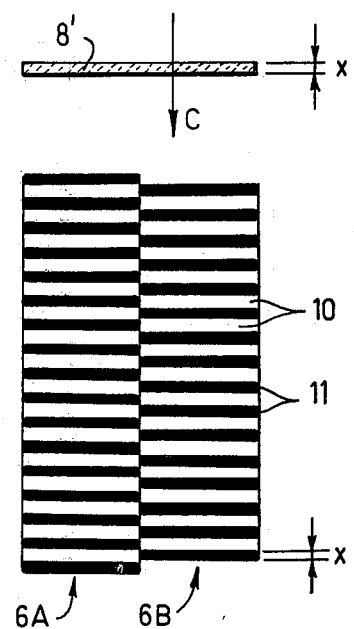
FIG. 3 shows a screen construction consisting of two component screens and to be used in the method and apparatus in accordance with the invention.
Figure 4:
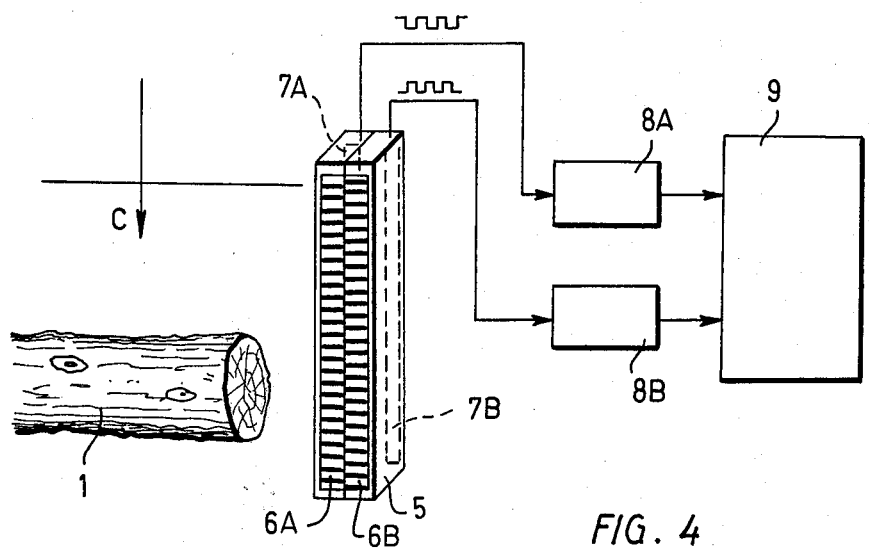
FIG. 4 is a partly schematical presentation of the measurement method in accordance with the invention.

E.g., when two component screens are used, the measurement precision value is one half of the maximum precision value of one screen. If we use the symbols:

number of pulses from screen 6A = k
number of pulses from screen 6B = m
total number of slots on screen A = a
total number of slots on screen B = b the length of the shadow of the object to be measured, i.e. the dimension S to be measured, is obtained from the formula $$S = (a + b - (k + m))x \qquad (4)$$

wherein the unit of measurement is x (FIG. 3), i.e. one half of the division of the screen. If one screen were used, the unit of measurement would be a whole division part of the screen, i.e. 2x.

It is possible to conceive of several alternatives within the scope of the invention. Thus, if required, the number of component screens may also be higher than two, e.g., 3 or 4, in which case the overlapping may be made denser and, at the same time, the precision of measurement be improved.

It should be noticed that the photoelectrical transformers may also receive the light pulses, e.g., by the intermediate of lenses or light-conductive filaments. Instead of having the shape of a stripe, the transparent areas may also have the shape of, e.g., a circle or square.

What we claim is:

1. Apparatus for optical measurement of the dimension of an object by sweeping a ray of light with a sweeping means which displaces a ray of light without changing its direction across a photoelectrical transformer for receiving light pulses and for converting same into electrical pulses through a grid placed in front of said transformer, said grid comprising alternating non-transparent and transparent increments such that the photoelectrical transformer receives light pulses, whereby the object to be measured is placed in front of the grid such that it prevents access of the light ray onto the grid and, accordingly, to the photoelectrical transformer within an area corresponding to the dimension to be measured, and the received light pulses are converted into electrical pulses, the number of which enables a calculation of the measured dimension, characterized in that said grid is divided into at least two component grids with equally divided grid area arrangements which are placed parallel to and overlapping each other; the light pulses received from said component grids being sensed and counted separately for each component grid by said photoelectrical transformer which is accordingly divided into at least two separate component transformers for receiving the light pulses from the different component grids; and counting and comparison means for counting and processing the electrical pulses coming from the component transformers.

2. Apparatus as claimed in claim 1, characterized in that the number of component grids is two.

3. Apparatus as claimed in claim 1, characterized in that the number of component grids is at least three.

4. Apparatus as claimed in claim 1 or 2 or 3, characterized in that the overlapping of the fields is arranged such that a non-transparent area on each component grid always coincides with a transparent area of the adjoining component grid.

* * * * *